United States Patent [19]

Moore et al.

[11] Patent Number: 5,426,435
[45] Date of Patent: Jun. 20, 1995

[54] OPEN LOOP PROXIMITY DETECTOR

[75] Inventors: Gerald J. Moore; David G. Bird, both of Mesa, Ariz.

[73] Assignee: Motorola, Inc., Schaumburg, Ill.

[21] Appl. No.: 263,832

[22] Filed: Oct. 28, 1988

[51] Int. Cl.6 .............................................. G01S 13/08
[52] U.S. Cl. ....................................................... 342/68
[58] Field of Search ........................ 342/68, 101, 98, 99

[56] References Cited

U.S. PATENT DOCUMENTS

| | | |
|---|---|---|
| 3,149,329 | 9/1964 | Prestwood et al. . |
| 3,745,573 | 7/1973 | Dick . |
| 3,945,008 | 3/1976 | Schmucker . |
| 4,232,609 | 11/1980 | Held . |
| 4,503,775 | 3/1985 | Thordarson . |
| 4,536,764 | 8/1985 | Freeman . |
| 4,599,616 | 7/1986 | Barbella et al. ................. 342/68 |
| 4,672,381 | 6/1987 | Labbe et al. .................... 342/68 |

Primary Examiner—Thomas H. Tarcza
Assistant Examiner—Mark Hellner
Attorney, Agent, or Firm—Frank J. Bogacz; Jordan C. Powell

[57] ABSTRACT

An open loop proximity detector is contemplated which receives a Doppler frequency when a target is first detected, and predicts a specific fuzing Doppler frequency. The detector continues to transmit and receive electromagnetic waves and sends a detonating signal to the fuze when the predicted fuzing Doppler frequency is received by the detector. The Doppler frequency of the first, or front surface in a forward moving direction of the target is received and is used to detonate the fuze. Thus the ideal surface of the target, the front surface, detonates the fuze and Doppler frequencies from other surfaces of the target are not allowed to interfere with the detonating process.

13 Claims, 3 Drawing Sheets

_(5,426,435)_

OPEN LOOP PROXIMITY DETECTOR

BACKGROUND OF THE INVENTION

This invention relates, in general, to Doppler radar, and more specifically, to proximity sensors.

Conventional proximity sensors, such as are used in fuzes for projectiles and missiles, use a system for locating and tracking a target called phase locked loop. This system continuously transmits and receives electromagnetic waves which operate to supply a Doppler frequency to the receiver. This Doppler frequency allows the fuze system to determine when the target is within a close proximity to the projectile. When the target is in close proximity to the projectile, the fuze is detonated and the projectile explodes.

When the target is first located by the sensor, the sensor will receive only a single Doppler profile. However, if the target has more than one surface reflecting electromagnetic waves back to the receiver, as the target gets closer to the projectile, several Doppler profiles become apparent from the various surfaces, each target surface represented by a different Doppler frequency whose magnitude depends on the surface's distance from the receiver. The multiple profiles give the sensor several targets rather than one target, and cause the fuze to be detonated on a profile which follows in time to the ideal detonating time and profile since the sensor cannot distinguish between the various Doppler frequencies.

SUMMARY OF THE INVENTION

It is, therefore, an object of the present invention to provide a proximity detector which is capable of distinguishing a specific surface of a target by utilizing information extracted from the Doppler profile.

A further object of the present invention is to provide a proximity detector which only activates when a specific predicted Doppler frequency is received.

Accordingly, an open loop proximity detector is contemplated which receives a Doppler frequency when a target is first detected, and selects a specific fuzing Doppler frequency. The detector continues to transmit and receive electromagnetic waves and sends a detonating signal to the fuze when the predicted fuzing Doppler frequency is received by the receiver. In this way, the Doppler frequency of the first, or front surface in a forward moving direction of the target is received and is used to detonate the fuze. Thus the ideal surface of the target, the front surface, detonates the fuze and Doppler frequencies from other surfaces of the target are not allowed to interfere with the detonating process.

Other objects and advantages of the present invention will become apparent from the following detailed description, particularly when considered in conjunction with the accompanying drawings.

DETAILED DESCRIPTION OF THE PREFERRED EMBODIMENT

Figure 1:
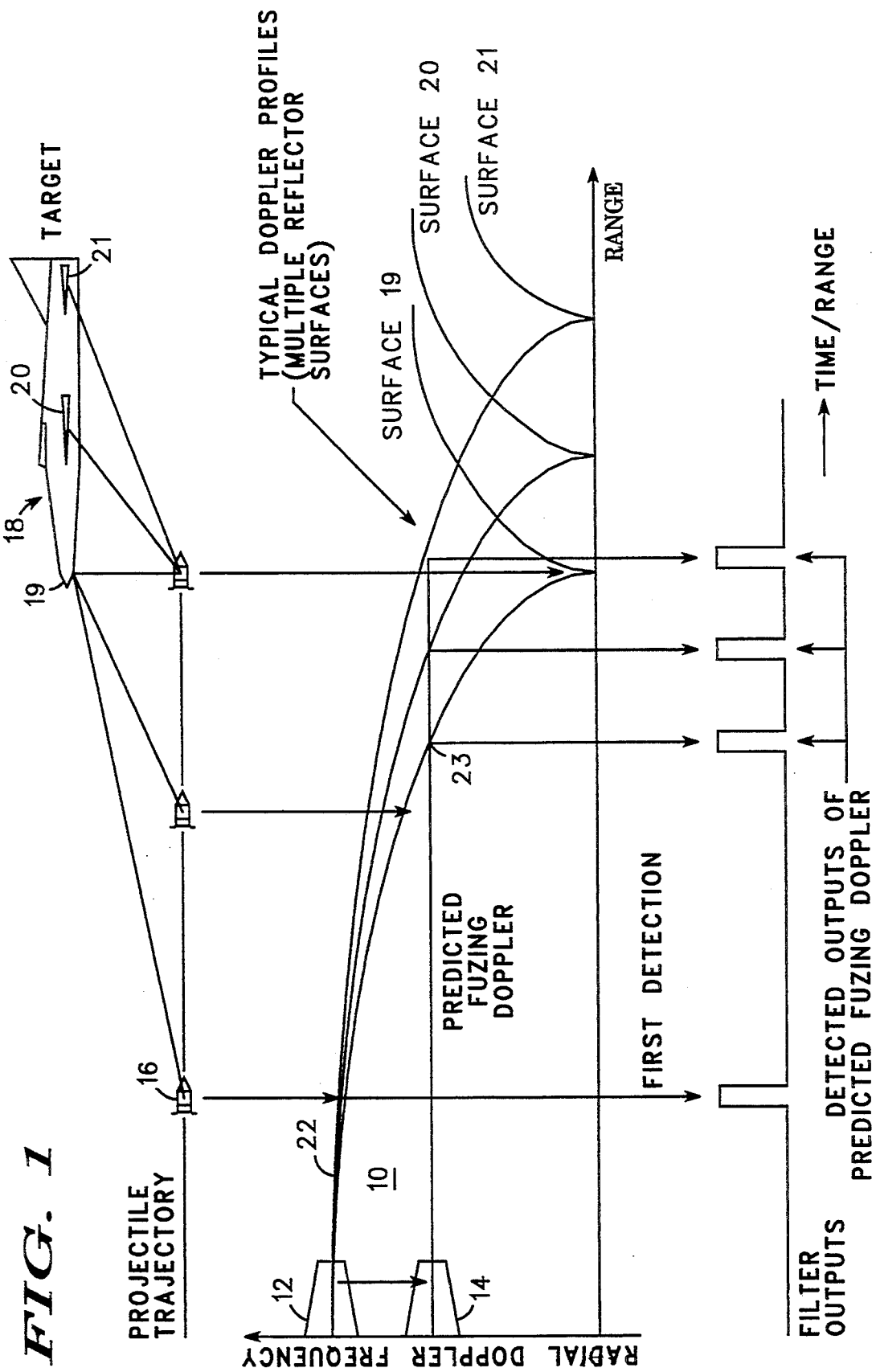
FIG. 1 is an illustration of the operating concept of the present invention as used in a fuze of a projectile.

Referring specifically to FIG. 1, a proximity detector 10 is represented having an acquisition filter position 12 and a predicted fuzing Doppler position 14. Also shown in FIG. 1 is projectile 16 and target 18 having reflecting surfaces 19, 20, and 21, with surface 19 being the foremost surface when target 18 is in a forward moving state. Surfaces 20 and 21 are respective subsequent surfaces in time.

As projectile 16 approaches target 18, it continuously transmits electromagnetic waves. These waves are reflected off of surfaces 19, 20, and 21 of target 18 and received by proximity detector 10. The change of magnitude of the time delay from transmission to reception of the electromagnetic waves is registered as a Doppler frequency. The farther away a target or reflecting surface is, the smaller the change of magnitude in the Doppler frequency.

When target 18 is first detected, projectile 16 and target 18 are sufficiently far away that Doppler frequencies from surfaces 19, 20, and 21 appear as a single Doppler frequency as shown by first detection point 22. As projectile 16 and target 18 approach each other, the Doppler frequencies from the different surfaces begin to separate and become distinguishable. Phase locked loop proximity sensors which continuously read doppler frequencies do not continuously monitor surface 19 at this point of frequency separation, but tend to pick up subsequent surfaces such as surface 20 or 21 as the different Doppler frequencies become more distinguishable. The ideal surface for fuze detonation is, however, surface 19. Proximity detector 10, which does not incorporate a phase looked loop, eliminates the problem of tracking subsequent surfaces by selecting a fuzing Doppler frequency (predicted fuzing Doppler position 14) and relaying a detonation signal only when the fuzing Doppler frequency is received by proximity detector 10 (detection point 23). As a measure of insuring detonation, if the proximity detector 10 does not relay a detonation signal for surface 19, surface 20 and subsequently surface 21 will also reflect the selected fuzing Doppler frequency at a subsequent time, allowing fuze detonation.

Figure 2:
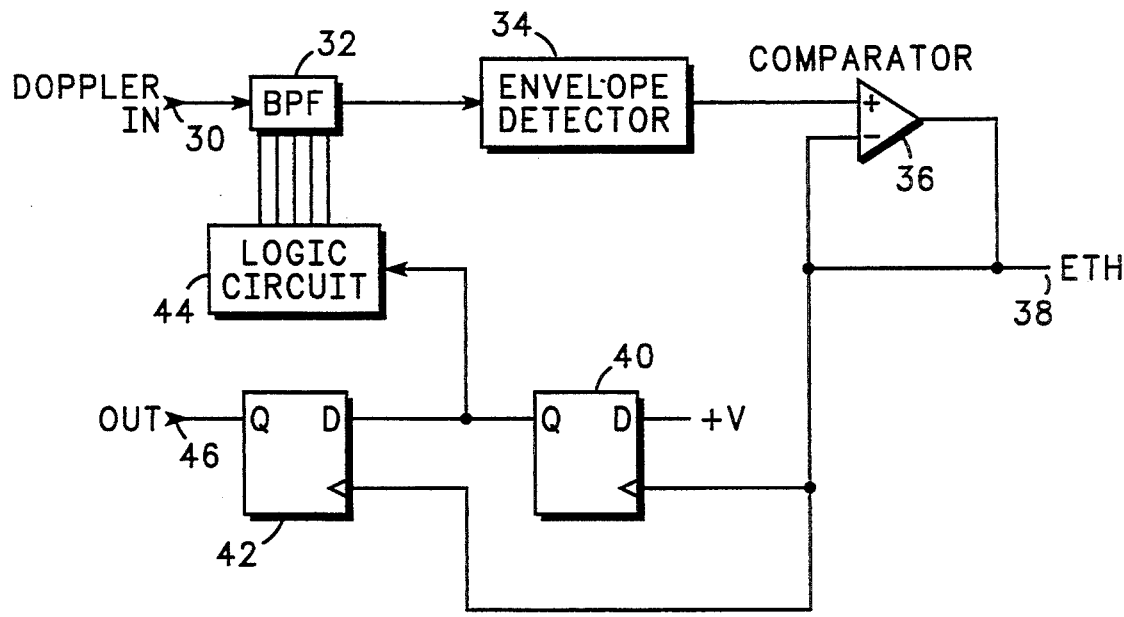
FIG. 2 is a schematic diagram of an embodiment of the present invention.

The operation of proximity detector 10 is shown in block diagram form in FIG. 2. When a Doppler frequency is received at reception point 30, it is filtered through programmable band-pass filter (bfp) 32 which is initially set to receive Doppler frequencies within a given frequency range. This Doppler frequency is received from bfp 32 by envelope detector 34. Envelope detector 34 generates an envelope voltage proportional to the magnitude of the Doppler frequency amplitude and relays this envelope voltage to comparator 36. Comparator 36 measures this envelope voltage against a predetermined threshold voltage (Eth) 38. If the envelope voltage is greater than or equal to threshold voltage 38, a first clock signal is relayed to register 40 and to register 42. Register 40 then sends a command signal to logic circuit 44 where a second Doppler frequency is selected and relayed to programmable bfp 32. Programmable bfp 32 then switches to the second Doppler frequency. When envelope detector 34 detects the second Doppler frequency filtered through programmable bfp 32, it relays a second envelope voltage to comparator 36 where the second envelope voltage must be greater than or equal to Eth 38 before a second clock signal is sent to first register 40 and second register 42. When second register 42 receives the second clock signal, it sends a fuze detonation signal to the fuze (not shown) through output 46.

In the embodiment shown in FIG. 2, reception point 30 is connected to bfp 32, whereby the Doppler frequency is relayed to bfp 32. Bfp 32 is then coupled in series with envelope 34, comparator 36, register 40, and logic circuit 44 to form a loop with logic circuit 44 coupled back into bfp 32. Register 42 is coupled to the loop between register 40 and logic circuit 44 to receive the command signals from register 40. Register 42 is also coupled to the loop between comparator 36 and register 40 in order to receive the first and second clock signals.

Figure 3:
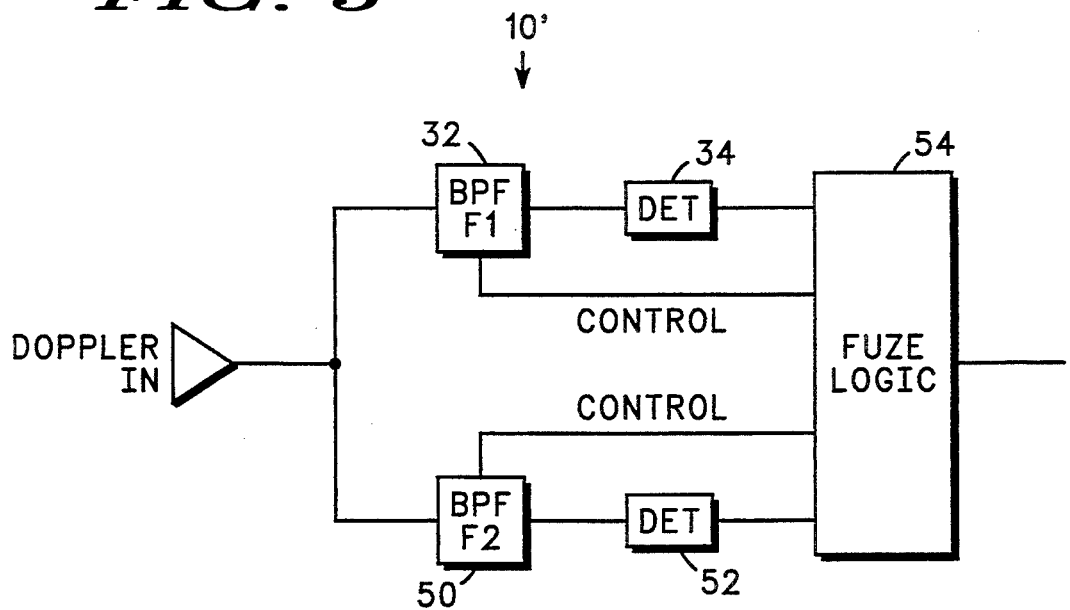
FIG. 3 is a schematic diagram of a second embodiment of the present invention.

By using the programmable frequency filter of proximity detector 10 rather than phase looked loop proximity sensors, proximity detector 10 only evaluates frequencies from a single forward surface without receiving interference from subsequent surface frequencies. Only the forward surface in time reflecting the fractional Doppler frequency is capable of causing detonation of the fuze.

Where tracking of target 18 is desired, additional programmable Doppler filters can be incorporated into proximity detector 10. FIG. 3 shows one such embodiment having at least one additional filter/detection scheme in proximity detector 10'.

Proximity detector 10' comprises programmable bfp 32 and envelope detector 34, as well as second programmable bfp 50 and second envelope detector 52. Both envelope detector 34 and second envelope detector 52 output to fuze logic 54 which comprises comparator 36, Eth 38, first and second registers 40 and 42, and logic circuit 44.

Second programmable filter 50 is designed to detect a third Doppler frequency which may be different in magnitude from the second Doppler frequency which programmable bfp 32 is designed to receive.

As shown in FIG. 3, Doppler frequencies are relayed to parallel lines coupling bfp 32 and envelope detector 34 in series along one line, and second programmable bpf 50 and second envelope detector 52 in series along the second line. Both lines are coupled in series with fuze logic 54. Both programmable bpf 32 and programmable bpf 50 are directly coupled to fuze logic 54 to receive the second Doppler frequency. Although this particular embodiment specifically outlines two parallel lines, proximity detector 10' may comprise more than two parallel lines.

Figure 4:
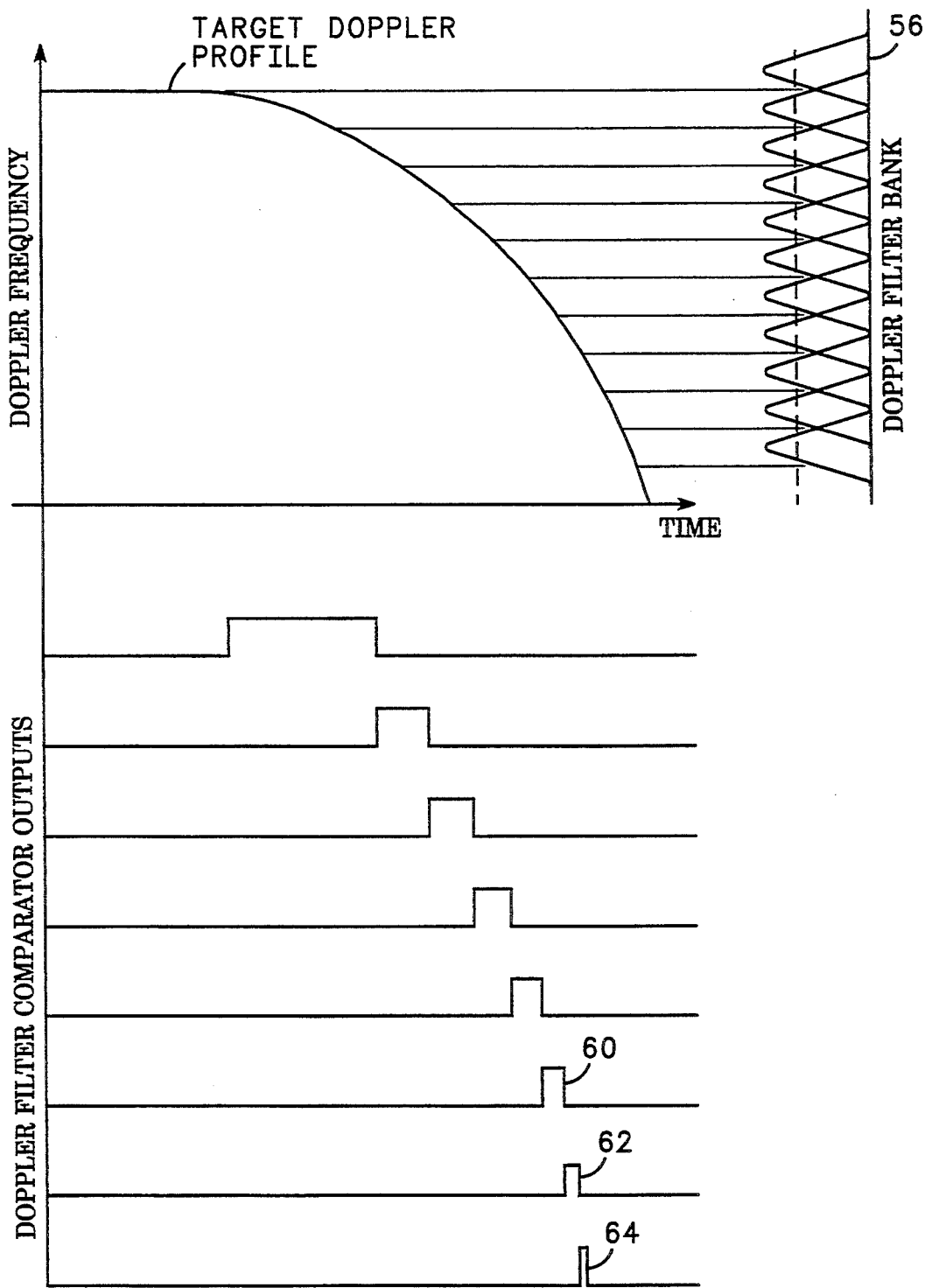
FIG. 4 is a plot showing the tracking ability of the second embodiment of the present invention.

FIG. 4 shows the tracking ability of proximity detector 10' when several filter/detection schemes are incoroporated as indicated by Doppler filter bank 56. Firing times 60, 62, and 64 correlate with Doppler frequencies received from surfaces 19, 20, and 21 respectively.

Thus it is apparent that there has been provided, in accordance with the invention, an open loop proximity detector that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An open loop proximity detector comprising:
    programmable filter means for detecting a first frequency and at least one subsequent doppler frequency;
    control means coupled to said programmable filter means, said control means receiving said first frequency and said subsequent frequency from said programmable filter means;
    selecting means for selecting a value for said subsequent doppler frequency when a command signal is received, said selecting means coupled to said control means to receive said first frequency, and coupled to said programmable filter means to relay said value of said subsequent doppler frequency to said programmable filter means; and
    said control means for differentiating between said first frequency and said subsequent doppler frequency to supply said command signal to said selecting means and supply an output signal to said proximity detector output when said subsequent doppler frequency is detected.

2. An open loop proximity detector according to claim 1 wherein said control means comprises:
    envelope detector means for generating an envelope voltage proportional to a magnitude of said first doppler frequency and said subsequent doppler frequency; and
    said envelope detector means coupled to said selecting means.

3. An open loop proximity detector according to claim 2 wherein said control means further comprises:
    comparator means for generating a plurality of clock signals when said envelope voltage is greater than or equal to a threshold voltage; and
    said comparator means coupled in series to said envelope detector means to receive said envelope voltage from said envelope detector means.

4. An open loop proximity detector according to claim 3 wherein said control means further comprises:
    register means for generating said command signal and said output signal;
    said register means coupled to said comparator means, to receive said plurality of clock signals;
    said command signal generated and relayed to said selecting means when a first of said plurality of clock signals is received; and
    said output signal generated and relayed to said proximity detector output when a subsequent clock signal is received from said comparator means.

5. An open loop proximity detector according to claim 1 wherein said proximity detector further comprises a plurality of said programmable filter means.

6. An open loop method of determining the proximity of a first object with respect to a second object when at least one of the objects are in motion, said method comprising the steps of:
    transmitting an electromagnetic signal from said first object, said electromagnetic signal reflecting back from said second object to said first object;
    receiving a portion of said reflected electromagnetic signal in a receiver;
    detecting a first Doppler frequency from a change in magnitude in frequency of said reflected electromagnetic signal, and filtering said first Doppler frequency through a programmable filter;
    selecting a subsequent doppler frequency from said portion;

relaying said subsequent doppler frequency to said programmable filter;

switching said programmable filter to receive frequencies at said subsequent doppler frequency;

receiving said reflected electromagnetic signal at said receiver until a change in frequency magnitude of said reflected electromagnetic signal equals said subsequent doppler frequency; and generating an output signal within said controller element when said change in frequency magnitude of said reflected electromagnetic signal equals said subsequent doppler frequency.

7. An open loop method according to claim 6 wherein said step of selecting a subsequent doppler frequency comprises:

envelope detecting said first doppler frequency to obtain a first envelope signal and comparing said first envelope signal with a to generate said subsequent doppler frequency.

8. An open loop method according to claim 7 wherein said step of selecting a subsequent doppler frequency further comprises:

generating a first clock signal when said first envelope signal is greater than or equal to said threshold voltage and relaying said first clock signal to a register element.

9. An open loop method according to claim 8 wherein said step of selecting a subsequent doppler frequency further comprises:

relaying a command signal from said register element to a logic circuit.

10. An open loop method according to claim 9 wherein said step of selecting a subsequent doppler frequency further comprises:

selecting said subsequent doppler frequency in said logic circuit.

11. An open loop method according to claim 6 wherein said step of generating an output signal comprises:

envelope detecting said subsequent doppler frequency to obtain a subsequent envelope signal and comparing said subsequent envelope signal with said threshold voltage.

12. An open loop method according to claim 11 wherein said step of generating an output signal further comprises:

generating a subsequent clock signal when said subsequent envelope signal is greater than or equal to said threshold voltage and relaying said subsequent clock signal to said register element.

13. An open loop method according to claim 12 wherein said step of generating an output signal further comprises:

generating a proximity detector output within said register element.

* * * * *

UNITED STATES PATENT AND TRADEMARK OFFICE
CERTIFICATE OF CORRECTION

PATENT NO. : 5,426,435
DATED : June 20, 1995
INVENTOR(S) : Gerald J. Moore et al.

It is certified that error appears in the above-indentified patent and that said Letters Patent is hereby corrected as shown below:

Column 4, claim 1, line 7, after "subsequent" insert --Doppler--.
Column 4, claim 3, line 35, delete words "in series".
Column 5, claim 7, line 18, following "a" insert --threshold voltage--.

Signed and Sealed this

Fourteenth Day of May, 1996

Attest:

BRUCE LEHMAN

Attesting Officer     Commissioner of Patents and Trademarks